United States Patent
Sweet

(10) Patent No.: US 6,817,434 B1
(45) Date of Patent: Nov. 16, 2004

(54) ACTIVE HYDRAULICALLY ACTUATED ON-DEMAND WHEEL END ASSEMBLY

(75) Inventor: Scott Richard Sweet, Waterford, MI (US)

(73) Assignee: Torque-Traction Technologies, Inc., Maumee, OH (US)

( * ) Notice: Subject to any disclaimer, the term of this patent is extended or adjusted under 35 U.S.C. 154(b) by 40 days.

(21) Appl. No.: 10/020,119

(22) Filed: Dec. 18, 2001

(51) Int. Cl.[7] .......................................... B60K 17/354
(52) U.S. Cl. ...................... 180/245; 180/197; 180/244; 180/246; 180/249
(58) Field of Search ................................ 180/244, 247, 180/24.08, 24.1, 197, 233, 242, 245, 248, 249, 246; 192/35; 74/650

(56) References Cited

U.S. PATENT DOCUMENTS

| | | | |
|---|---|---|---|
| 3,437,187 A | | 4/1969 | Umeda et al. |
| 4,681,180 A | | 7/1987 | Oyama et al. |
| 4,921,065 A | | 5/1990 | Hamada et al. |
| 5,105,901 A | * | 4/1992 | Watanabe et al. ........... 180/249 |
| 5,119,900 A | | 6/1992 | Watanabe et al. |
| 5,135,071 A | * | 8/1992 | Shibahata et al. .......... 180/249 |
| 5,152,362 A | * | 10/1992 | Naito ........................ 180/248 |
| 5,353,889 A | | 10/1994 | Hamada |
| 5,396,421 A | | 3/1995 | Niikura et al. |
| 5,456,641 A | * | 10/1995 | Sawase ........................ 475/86 |
| 5,690,002 A | | 11/1997 | Showalter |
| 5,845,546 A | * | 12/1998 | Knowles et al. ............. 74/650 |
| 5,884,738 A | * | 3/1999 | Joslin et al. ................. 192/35 |
| 5,894,904 A | | 4/1999 | Yakou et al. |
| 5,984,039 A | | 11/1999 | Mayr |
| 6,070,495 A | * | 6/2000 | Kuroda et al. ............... 74/650 |
| 6,095,276 A | | 8/2000 | Kuroda et al. |
| 6,327,935 B1 | * | 12/2001 | Joslin et al. ................. 74/650 |
| 6,349,809 B1 | * | 2/2002 | Isley, Jr. .................... 192/35 |

* cited by examiner

*Primary Examiner*—Lesley D. Morris
*Assistant Examiner*—Daniel Yeagley
(74) *Attorney, Agent, or Firm*—Liniak, Berenato & White

(57) ABSTRACT

The vehicular axle assembly includes an input shaft, a drive gear assembly connecting the input shaft to a pair of output shafts, pair of opposite wheel ends mounted to the outboard ends of the output shafts, a pair of wheel end disconnect assembly disposed between and selectively connecting each of the pair of the output shafts to the corresponding one of the wheel ends, and a control system controlling the wheel end disconnect assemblies to selectively transfer torque from the input shaft to either the wheel ends. Each of the wheel end disconnect assemblies has a hydraulically actuated friction clutch assembly integrated with the corresponding wheel ends for facilitating both selective torque coupling and limited slip between the wheel ends and the corresponding output shafts. The friction clutch assemblies are actuated by a hydraulic actuator, also adapted to supply pressurized hydraulic fluid to a vehicle wheel brake system.

20 Claims, 6 Drawing Sheets

ACTIVE HYDRAULICALLY ACTUATED ON-DEMAND WHEEL END ASSEMBLY

BACKGROUND OF THE INVENTION

1. Field of the Invention

The present invention relates to a hydraulically actuated wheel end assembly, and more particularly to a wheel end assembly including a friction clutch for selectively and independently controlling distribution of an engine torque between laterally opposed vehicle wheels for eliminating the necessity for a differential assembly.

2. Description of the Prior Art

Drive train system of current four-wheel drive vehicles conventionally include a front differential gearing adapted to distribute a driving force between left and right front wheels, a center differential gearing adapted to distribute the driving force between the front wheels and rear wheels, and a rear differential gearing adapted to distribute the driving force between the left and right rear wheels. Also, the four-wheel drive vehicles usually include a clutch for intermittently transmitting the driving force to a transfer means adapted to transmit the driving force for the front wheels to the rear wheels.

To transmit the driving force to the left and right rear wheels, for example, when the vehicle runs out of a muddy place, a full-time type four-wheel drive vehicle is accompanied by a problem that it is necessary to mount a differential lock device on the center differential and the rear differential, resulting in an undesirabe increase in the number of parts and a complicated structure. A part-time type four-wheel drive vehicle is accompanied by a problem that because clutches are provided on the transfer means, the number of parts is increased, and the structure is complicated. Moreover, since driving torque is equally transmitted to both wheels by the differential gearing, it is extremely complicated to improve stability and driveability at cornering of such drive train system.

SUMMARY OF THE INVENTION

The present invention provides a novel vehicular axle assembly, especially for a four-wheel drive motor vehicle.

The vehicular axle assembly in accordance with the preferred embodiment of the present invention includes an input shaft, a drive gear assembly connecting the input shaft to a pair of output shafts, a wheel end disconnect assembly disposed between and selectively connecting each of the pair of the output shafts to a corresponding one of said wheel ends, each of the wheel end disconnect assemblies has a hydraulically actuated friction clutch assembly integrated with the corresponding one of the wheel ends for facilitating both selective torque coupling and limited slip between either said wheel ends and the corresponding output shafts, and a control system controlling the friction clutch assemblies to selectively transfer torque from the input shaft to either the wheel ends.

In accordance with the first exemplary embodiment of the present invention, the axle assembly of the present invention is employed in one of the axles of the four-wheel drive motor vehicle, such as a rear axle. The invention further includes an electronic control system providing an active control of the driving torque distribution between the left and right rear wheels of the rear axle assembly. The electronic control system includes an electronic control unit (ECU), and a hydraulic actuator adapted to supply pressurized hydraulic fluid to conventional wheel brake assemblies and the hydraulically actuated friction clutch assemblies integrated with the wheel ends of the rear axle. An independent sensor arrays or vehicle Controller Area Network (CAN) Bus is provided to generate input signals to the ECU. The ECU controls both the braking system (including an Antilock Braking System (ABS)), and the driving torque distribution between the left and right rear wheels of the rear axle assembly.

In accordance with the second exemplary embodiment of the present invention, the axle assembly of the present invention is employed in both front and rear axles of the four-wheel drive vehicle.

Therefore, the vehicular axle assembly in accordance with the present invention represents a novel arrangement that allows selective and independent control of a driving torque distribution between the laterally opposed vehicle wheels for improving stability and drivability at cornering and on slippery road surfaces, and eliminates an axle differential gearing.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
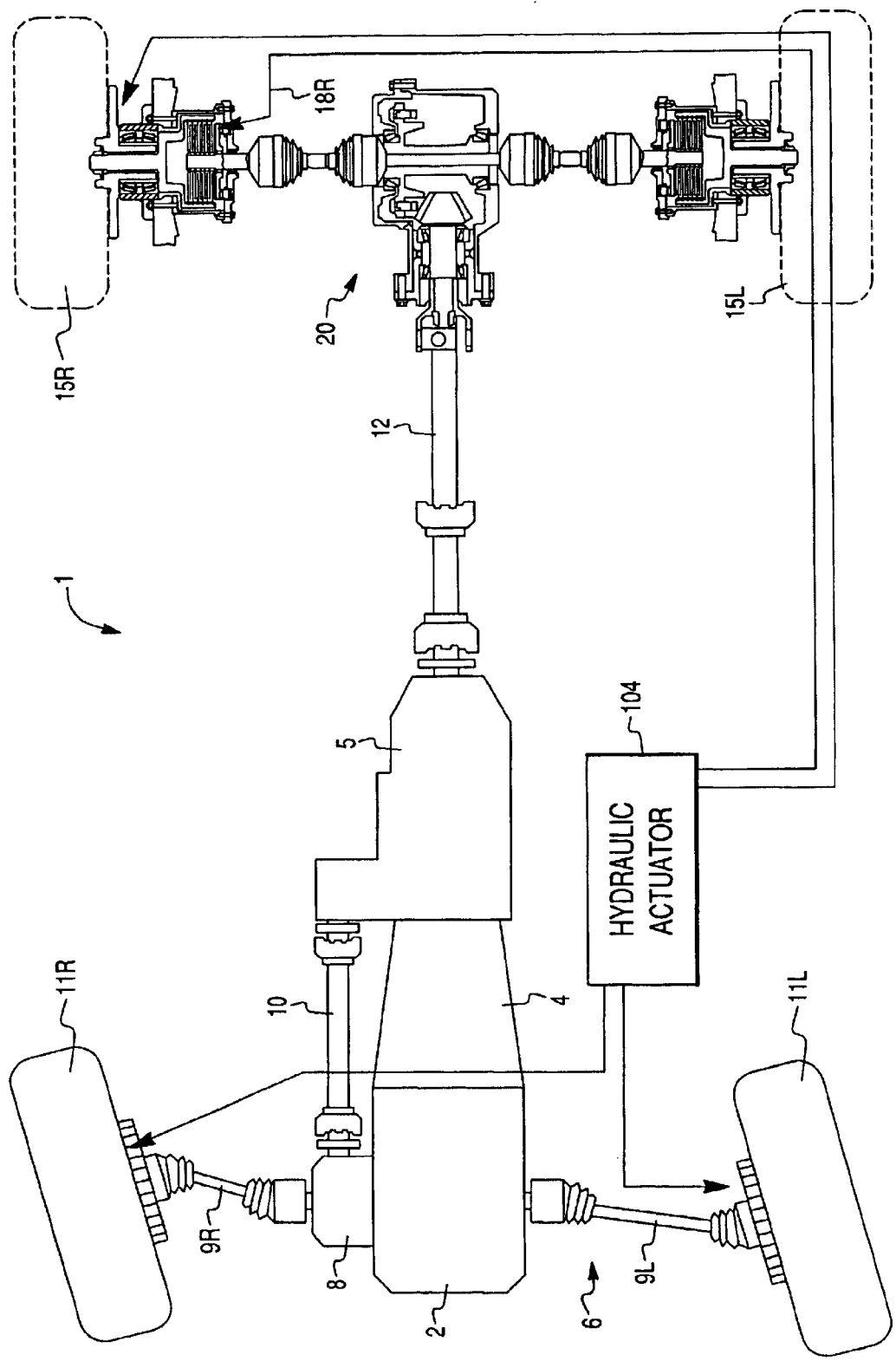
FIG. 1 is a schematic view of a drive train arrangement of a four-wheel drive vehicle in accordance with the first exemplary embodiment of the present invention.

FIG. 1 of the drawings illustrates a drive train arrangement of a four-wheel drive vehicle 1 in accordance with the first exemplary embodiment of the present invention. The vehicle 1 includes an engine 2 mounted at a front portion of a vehicle body, a transmission 4 provided integrally with the engine 2, a transfer case 5 that connects the transmission 4 to a conventional front axle assembly 6 through a front propeller shaft 10 and to an active rear axle assembly 20 trough a rear propeller shaft 12. A front differential 8 is capable of controlling the transmission of a driving torque to front drive shafts 9L and 9R of front wheels 11L and 11R respectively. The rear axle assembly 20 provides the on-demand transmission of a driving torque to rear wheels 15L and 15R.

When the transmission of the driving torque to the rear axle assembly 20 is cut off, the vehicle 1 is brought into a front wheel drive mode in which only the front wheels 11L and 11R are driven, and, when the driving torque is transmitted to the rear axle assembly 20, the vehicle is brought into a four-wheel drive mode in which both of the front wheels and the rear wheels are driven. Further, in the four-wheel drive mode, the rear axle assembly 20 is capable of controlling the distribution of the driving torque to the left and right rear wheels 15L and 15R to any extent.

Figure 2:
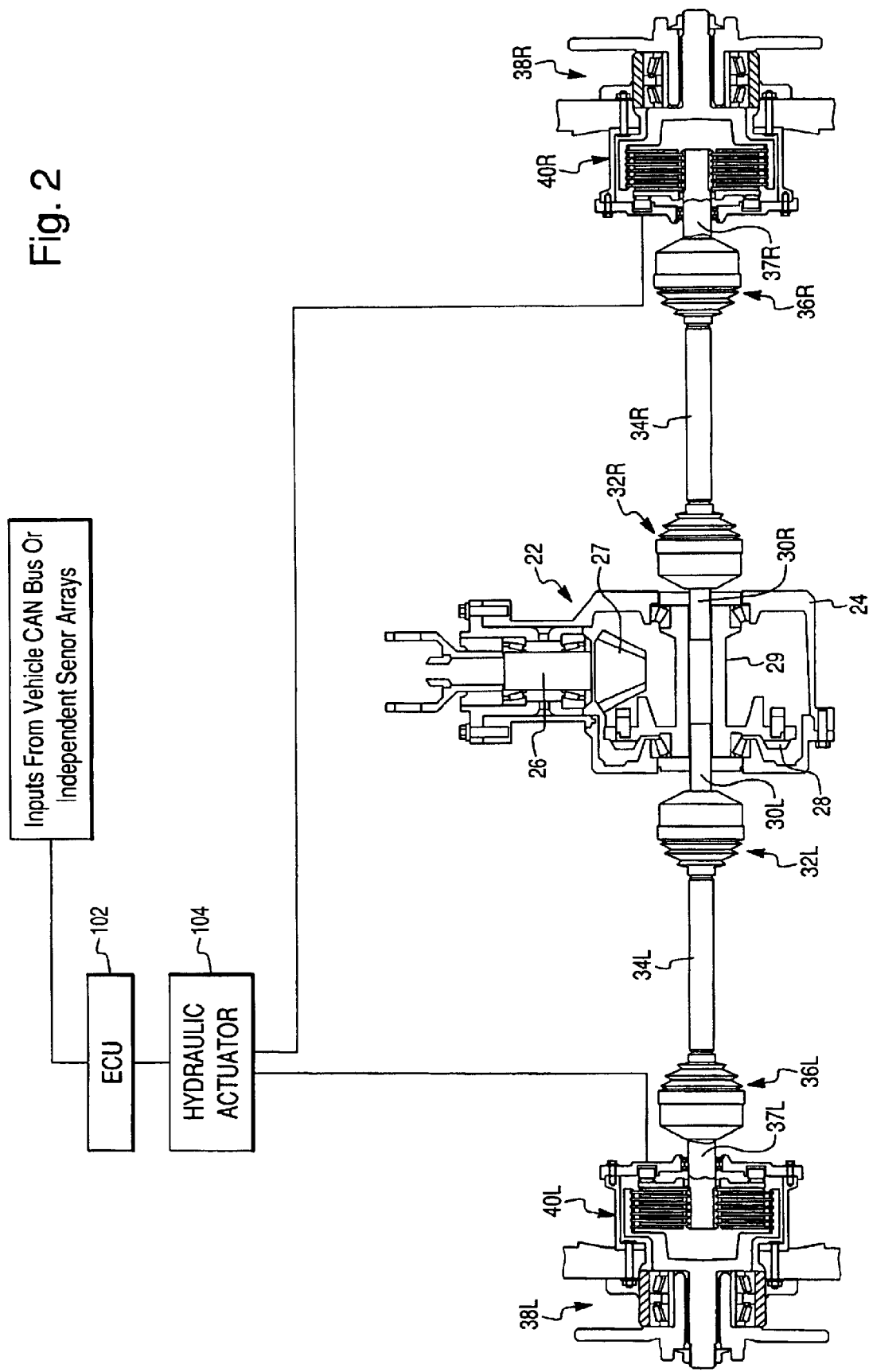
FIG. 2 is a schematic view of a rear axle assembly in accordance with the present invention.

The structure of the rear axle assembly 20 will be described with the reference to FIG. 2. The rear axle assembly 20 has a substantially laterally symmetric structure. The rear axle assembly 20 includes a final drive assembly 22, a pair of left and right stub shafts 30L and 30R leading outwardly from the final drive assembly 22, a pair of left and right axle shafts 34L and 34R coupled to the stub shafts 30L and 30R through a pair of universal joints 32L and 32R, and a pair of wheel ends 38L and 38R each coupled to the corresponding axle shafts 34L and 34R through an integrated wheel end disconnect assembly in the form of a hydraulically actuated friction clutch assembly 40L or 40R, and a universal joint 36L or 36R.

The final drive assembly 22 includes a casing 24 housing a rear drive shaft 26 having a pinion gear 27 at the rear end thereof that engages a bevel gear 28. The front end of the rear drive shaft 26 is drivingly coupled to the rear propeller shaft 12. The bevel gear 28 is non-rotatably mounted to a shaft member 29 of the final drive assembly 22. The shaft member 29 drivingly couples the left and right stub shafts 30L and 30R, preferably through the spline connection.

Preferably, the universal joints 32L, 32R and 36L, 36R are of a constant velocity type. However, any other appropriate types of the universal joint are within the scope of the present invention.

It was noted hereinabove that the rear axle assembly 20 has a substantially laterally symmetric structure. Since the wheel ends 38L and 38R and the friction clutch assembly 40L or 40R and are substantially identical, only the right wheel end 38R and the right friction clutch assembly 40R will be described in details herein below, and a duplicate description of the left wheel end 38L and the left clutch assembly 40L is omitted.

Figure 3:
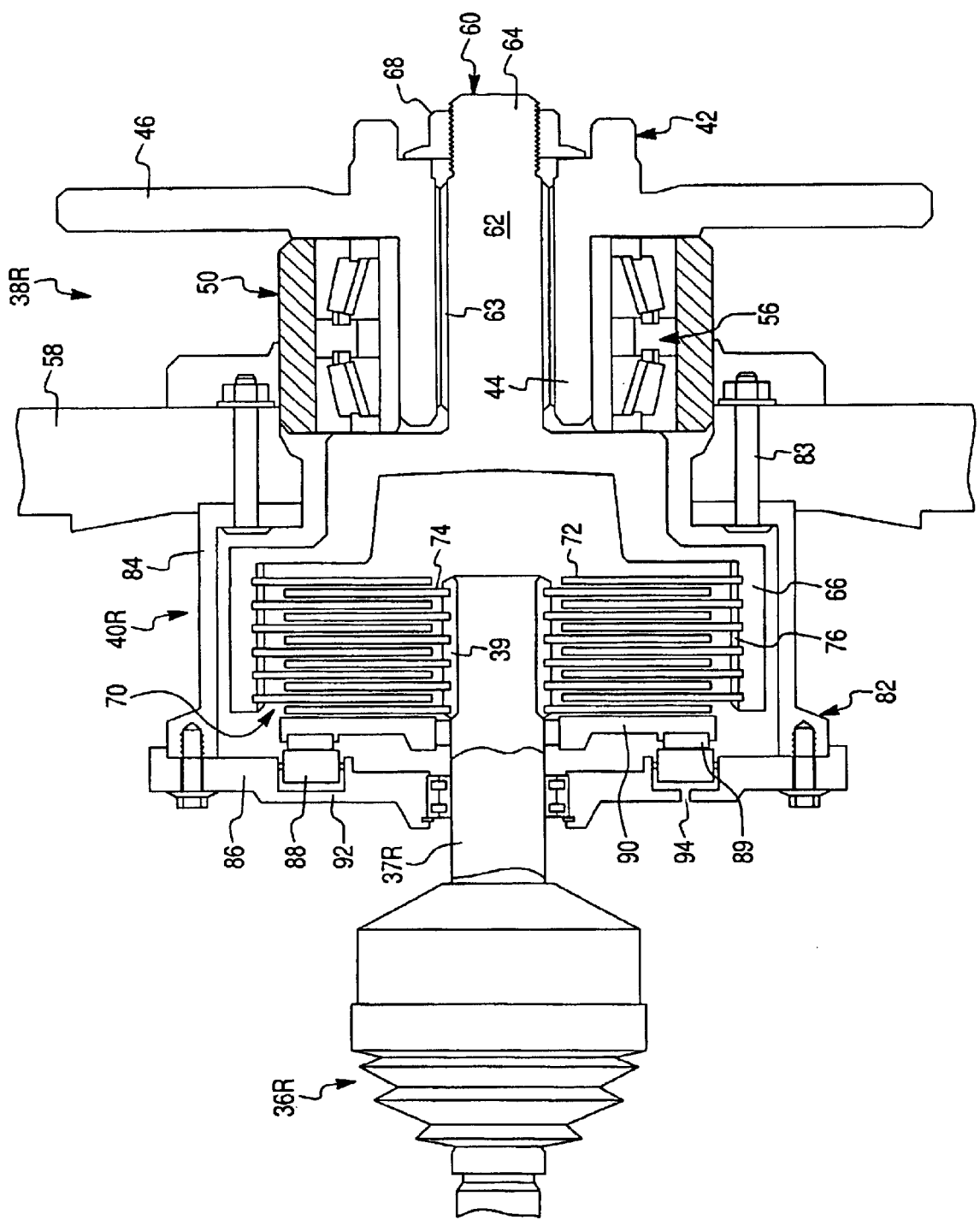
FIG. 3 is a partial sectional view of a right wheel end of the rear axle assembly in accordance with the present invention.

FIG. 3 of the drawings illustrate in detail the preferred arrangement of the right wheel end 38R. The right wheel end 38R comprises a wheel spindle 42 rotatably supported within a bearing assembly 50 by a pair of tapered roller bearings 56. The bearing assembly 50 is conventionally fixed to a wheel carrier 58.

The wheel spindle 42 has a cylindrical shaft portion 44 and a wheel-mounting flange portion 46. The vehicle wheel 15R (shown in FIG. 1) is drivingly mounted to the wheel-mounting flange portion 46 of the spindle 42 utilizing a plurality of wheel mounting studs (not shown), which are circumferentially spaced around the wheel-mounting flange portion 46 and extend therethrough. The wheel spindle 42 is driven by a drive shaft assembly 60 including a stub shaft 62 extending through a central bore formed through the shaft portion 44 of the spindle 42. The stub shaft 62 is drivingly coupled to the spindle 42 through a suitable splined connection 63 in a manner that is well known to those skilled in the art. The spindle 42 is retained on the stub shaft 62 by a nut 68, which engages a threaded outboard end 64 of the stub shaft 62.

The right wheel end 38R further includes the friction clutch assembly 40R integrated therewith. The hydraulically actuated friction clutch assembly 40R, well known in the prior art, includes a multi-plate friction clutch pack assembly 70 having sets of alternating outer friction plates 72 and inner friction plates 74. Conventionally, an outer circumference of the outer friction plates 72 is provided with projections that non-rotatably engages corresponding grooves 76 formed in a clutch drum 66. Preferably, the clutch drum 66 is integral part of the drive shaft assembly 60 and is formed integrally with the stub shaft 62 at an inboard end thereof. At the same time, the outer friction plates 72 are slideable in axial direction. The inner friction plates 74 are splined to grooves 39 of an input stub shaft 37R so that the inner friction clutch plates 74 are non-rotatably, but axially slidably mounted on the stub shaft 37R. The stub shaft 37R axially outwardly extends from the universal joint 36R.

Torque capacity of the friction clutch pack assembly 70 can be tailored to the specific vehicle requirements by sizing the clutch pack assembly (number of friction plates, plate diameters, friction materials).

As further illustrated in FIG. 3, the friction clutch pack assembly 70 is disposed within a casing 82 fixed to the wheel carrier 58, preferably by a bolt connection 83. The casing 82 includes a substantially cylindrical first member 84, and an annular second member 86 fixed to the first member 84.

The friction clutch assembly 40R is hydraulically actuated, and further includes a piston 88 slidably received in a pressure chamber 92 formed in the second member 86 of the casing 82. A thrust bearing 89 and a pressure plate 90 are disposed between the piston 88 and the clutch pack assembly 70 to transmit a pressure from the piston 88 to the friction plates 72 and 74 to axially load the clutch pack assembly 70. The pressure chamber 92 is provided with an inlet port 94. A hydraulic pressure supply line 18R (shown in FIG. 1) is conventionally attached to the inlet port 94. It well known to those skilled in the art that the hydraulically actuated friction clutch assemblies of this type have variable torque transmission ratio (which is ratio between the input torque applied to the input shaft and the output torque driving the output shaft of the friction clutch assembly) depending on the hydraulic pressure applied to the hydraulic actuator loading the friction clutch pack assembly.

Figure 4:
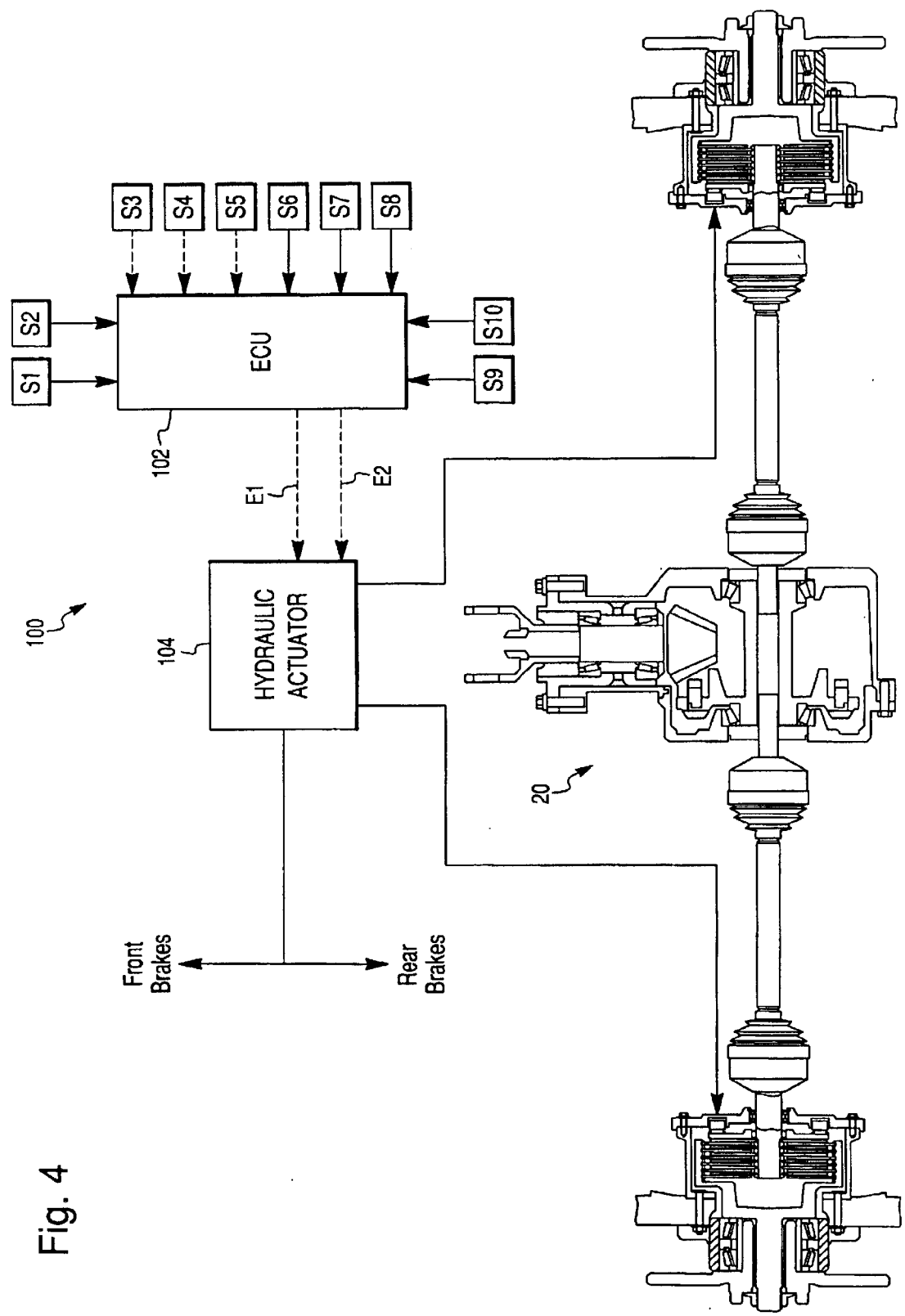
FIG. 4 is schematic diagram of an electronic control system in accordance with the first exemplary embodiment of the present invention.

Referring now to FIG. 4, there is illustrated a schematic diagram of an electronic control system, indicated generally at 100, providing an active control of the driving torque distribution between the left and right rear wheels 15L and 15R of the rear axle assembly 20. The electronic control system 100 includes an electronic control unit (ECU) 102. The ECU 102 may be embodied as a conventional microprocessor or similar computing apparatus which can be programmed to generate one or more electrical output signals in response to a plurality of electrical input signals. A plurality of sensors is provided to generate input signals to the ECU 102. Alternatively, signals from a vehicle Controller Area Network (CAN) Bus may be employed. The ECU 102 of the present invention controls both a conventional vehicle braking system (including an Antilock Braking System (ABS)) (not shown), and the driving torque distribution between the left and right rear wheels 15L and 15R of the rear axle assembly 20. This ensures compatibility between the antilock braking system, a brake control system and a vehicle stability system on a given vehicle.

In the preferred embodiment of the present invention, connected to the ECU 102 is a plurality of sensors provided to generate input signals thereto, such as a pair of front wheel speed sensors S1 and S2 for detecting the speed of the right and left front wheels respectively, a pair of rear wheel speed sensors S3 and S4 for detecting the speed of the right and left rear wheels respectively, an engine throttle position sensor S5, a front propeller shaft speed sensor S6 based on a number of rotations of the front propeller shaft 10, a steering angle sensor S7 for detecting a steering angle of a steering wheel (not shown), a yaw rate sensor S8 for detecting a yaw rate of a vehicle body, and a rear propeller shaft speed sensor S9 based on a number of rotations of the rear propeller shaft 12. Alternatively, or in addition to the yaw rate sensor S8, a lateral acceleration sensor S10 may be employed for detecting a lateral acceleration of a vehicle body (not shown).

The input signals from the sensors S1–S10 are evaluated and processed in the ECU 102 that generates control output signals E1 and E2 in response thereto. The ECU 102 sends the control output signals E1 and E2 to a hydraulic actuator 104 adapted to supply pressurized hydraulic fluid to both conventional wheel brake assemblies (not shown) and the left and right hydraulic clutch assemblies 40L and 40R. A first output signal E1 from the ECU 102 provides the hydraulic actuator 104 with instructions for controlling the operation of wheel brake assemblies of the vehicle braking system including ABS (not shown), and a vehicle stability control system (not shown). A second output signal E2 from the ECU 102 provides the hydraulic actuator 104 with instructions for controlling the engaged states of the left and right hydraulic clutch assemblies 40L and 40R integrated into the wheel ends 38L and 38R based on the signals from the sensors S1 to S10.

The torque distribution between the left and right hydraulic clutch assemblies 40L and 40R is attained through control of hydraulic pressure supplied to the clutch assemblies 40L and 40R by the hydraulic actuator 104.

The braking system employed in the vehicle 1 is of a well known form and does not require detailed description.

The operation of the first exemplary embodiment of the active rear axle assembly 20 of the present invention having the above-described construction will be described hereinbelow.

At the start of the vehicle 1, a driving force from the engine 2 is first transmitted to the left and right front wheels 11L and 11R through the transmission 6, the front differential 8 and the drive shafts 9L and 9R. The driving force from the engine 2 is also transmitted to the rear axle assembly 20 through the propeller shaft 12 to rotate the rear drive shaft 26, the driven bevel gear 28, and the axle shafts 34L and 34R driving the input stub shafts 37L and 37R of the wheel ends 38L and 38R. However, the left and right friction clutch assembly 40L or 40R are in their non-engaged states and hence, the rear wheels 15L and 15R are not driven. At this time, the rotational speeds of the front wheels 11L and 11R are detected by the front propeller shaft speed sensor S6, and the rotational speeds of the rear wheels 15L and 15R are detected by the rear propeller shaft speed sensor S9. However, at a moment when the driving force has been transmitted to the front wheels 11L and 11R, the driving force is still not transmitted to the rear wheels 15L and 15R due to the fact that the left and right friction clutch assemblies 40L and 40R are in their non-engaged states. Therefore, a differential rotation is produced between the front wheels 11L and 11R and the rear wheels 15L and 15R. When the differential rotation between the front wheels 11L and 11R and the rear wheels 15L and 15R is detected, the left and right friction clutch assembly 40L or 40R are brought into their engaged states by the hydraulic actuator 104 based on the signal E2 from the ECU 102, thereby permitting the torque from the rear drive shaft 26 to be transmitted to the rear wheels 15L and 15R. In this manner, the vehicle 1 is brought into the four-wheel drive state.

The active rear axle assembly 20 is capable of generating a difference between the engagement forces of the left and right friction clutch assemblies 40L and 40R by controlling a value of hydraulic pressure supplied to the pressure chamber 92 of the left and clutch assembly 40L or 40R for varying the torque transmission ratios thereof, so that any torque is distributed to the left and right rear wheels 15L and 15R, thereby acting as a differential and controlling the steering characteristic of the vehicle. A reference yaw rate is calculated based on a steering angle detected by the steering angle sensor S7, a vehicle speed calculated based on outputs from the front and rear propeller shaft speed sensors S6 and S9, and a lateral acceleration detected by the lateral acceleration sensor S10, for example, during turning of the vehicle 1. This reference yaw rate is compared with an actual yaw rate detected by the yaw rate sensor S8. If the vehicle 1 is in an over-steering tendency or an under-steering tendency as a result of the comparison, a control for eliminating the over-steering tendency or the under-steering tendency can be performed.

Specifically, when the vehicle 1 is in the over-steering tendency, a yaw moment causing the vehicle body to be turned outwards as viewed during the turning of the vehicle can be generated to eliminate the over-steering tendency by increasing the engagement force of the friction clutch assembly 40L or 40R that is on the inner side during turning of the vehicle, and decreasing the engagement force of the friction clutch assembly 40L or 40R on the outer side during turning of the vehicle 1. When the vehicle 1 is in the under-steering tendency, a yaw moment causing the vehicle body to be turned inwards as viewed during turning of the vehicle can be generated to eliminate the under-steering tendency by decreasing the engagement force of the friction clutch assembly 40L or 40R on the inner side during turning of the vehicle, and increasing the engagement force of the friction clutch assembly 40L or 40R on the outer side during turning of the vehicle.

When there is a need to lock the differential, the left and right friction clutch assemblies 40L and 40R are brought into the engaged states by the maximum transmitted torque. In this manner, the vehicle 1 is brought into the four-wheel drive state and a differential-locked state in which the left and right rear wheels 15L and 15R have been integrally coupled to each other, which can contribute to an increase in driving force when the vehicle runs out of a muddy place. Alternatively, the control system allows to lock-up the wheel with traction and unlock the wheel without traction.

In this way, the four-wheel drive state and the front wheel drive state can be easily switched over from one to another in a simple structure in which the two hydraulically actuated friction clutch assemblies 40L and 40R are merely provided with the rear axle assembly 20. Moreover, any driving force can be distributed to the left and right rear wheels 15L and 15R, and a differential locking mechanism can be provided.

Moreover, the present invention allows to perform a traction control of the rear wheels 15R and 15L by monitoring the engine throttle position via the throttle position sensor S5, and controlling engagement of the friction clutch assemblies 40L and 40R in response thereto.

Figure 5:
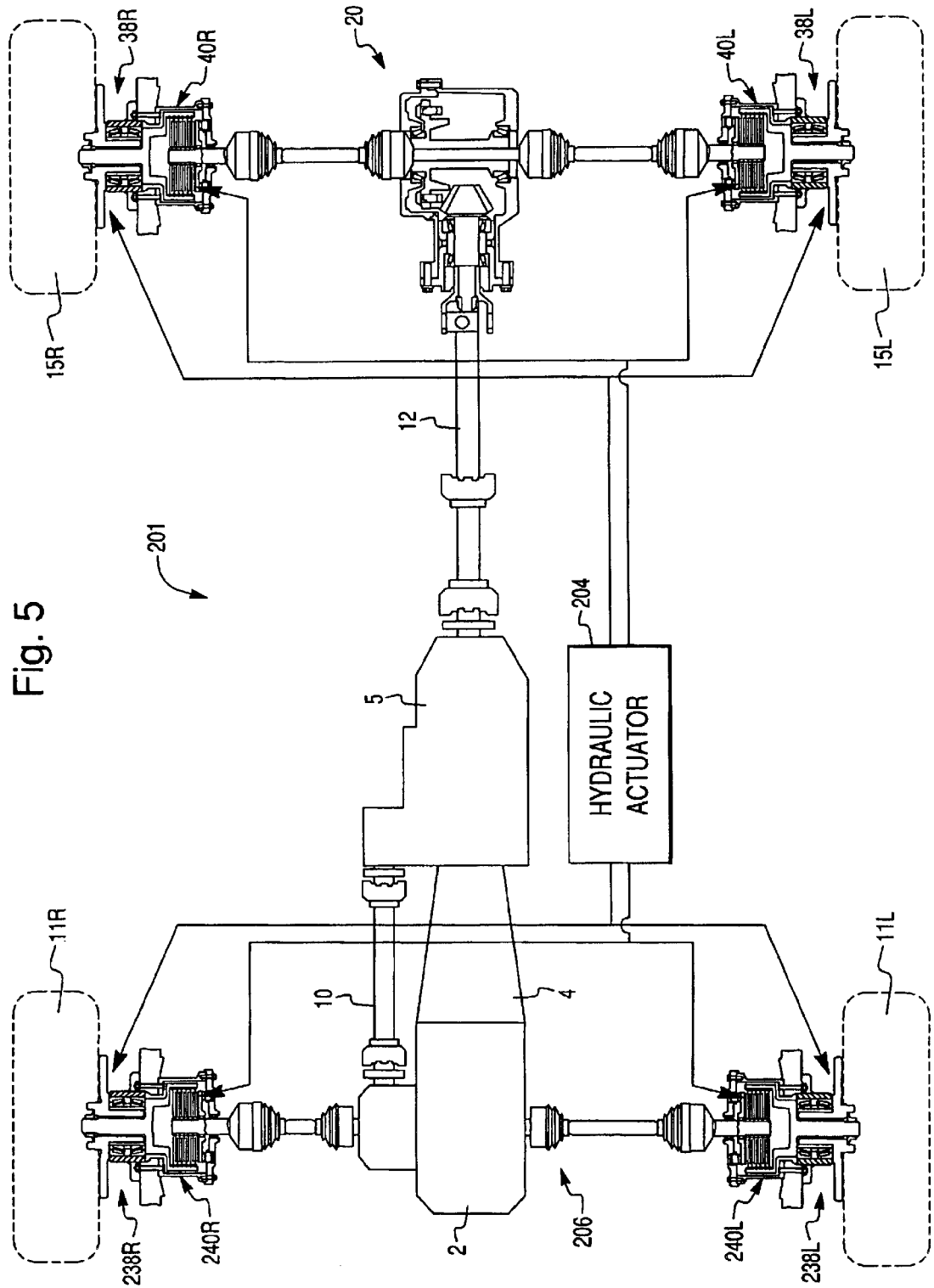
FIG. 5 is a schematic view of a drive train arrangement of a four-wheel drive vehicle in accordance with the second exemplary embodiment of the present invention.
Figure 6:
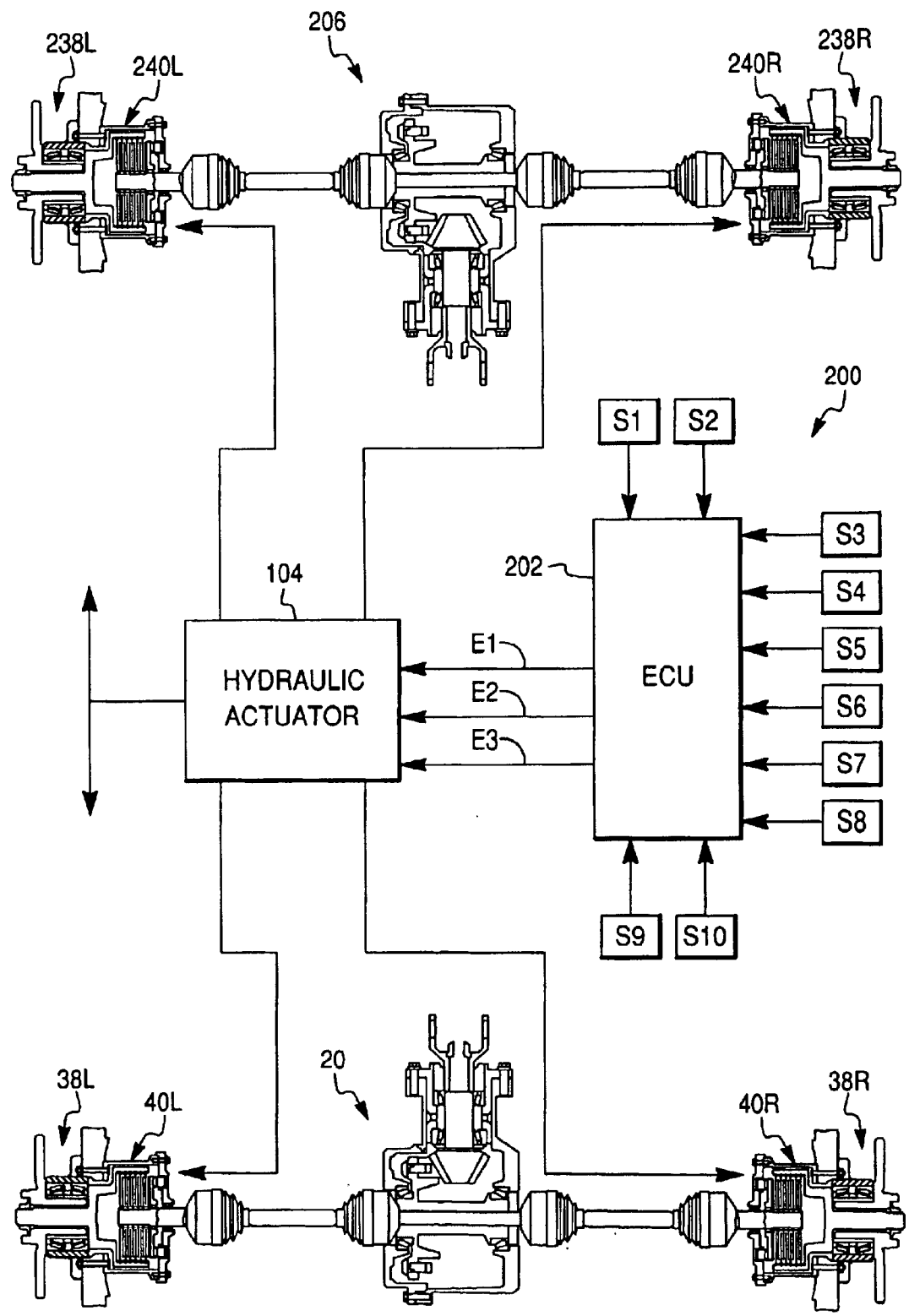
FIG. 6 is schematic diagram of an electronic control system in accordance with the second exemplary embodiment of the present invention.

FIGS. 5 and 6 illustrate the second exemplary embodiment of the present invention. Components, which are unchanged from, or function in the same way as in the first exemplary embodiment depicted in FIGS. 1–4 are labeled with the same reference characters, sometimes without being described in details since similarities between the corresponding parts in the two embodiments will be readily perceived by the reader.

As illustrated in FIG. 5, the second exemplary embodiment of the present invention depicts a four-wheel drive vehicle 201 including a front axle assembly 206 and a rear axle assembly 20. The front axle assembly 206 is structurally and functionally substantially similar to the rear axle assembly 20 as described above in the first exemplary embodiment of the present invention. Alike to the rear axle assembly 20, the front axle assembly 206 has no differential gearing and includes opposite wheel ends 238L and 238R, each provided with a hydraulically actuated friction clutch assembly (240L or 240R), integrated therewith.

Referring now to FIG. 6, there is illustrated a schematic diagram of an electronic control system in accordance with the second exemplary embodiment of the present invention, indicated generally at 200, providing an active control of the driving torque distribution between both the left and right front wheels 11L and 11R of the front axle assembly 206, and the left and right rear wheels 15L and 15R of the rear axle assembly 20. The electronic control system 200 includes an electronic control unit (ECU) 202. The ECU 202 may be embodied as a conventional microprocessor or similar computing apparatus which can be programmed to generate one or more electrical output signals in response to a plurality of electrical input signals. Connected to the ECU 202 is a plurality of sensors provided to generate input signals thereto, such as a pair of front wheel speed sensors S1 and S2 for detecting the speed of the right and left front wheels respectively, a pair of rear wheel speed sensors S3 and S4 for detecting the speed of the right and left rear wheels respectively, an engine throttle position sensor S5, a front propeller shaft speed sensor S6 based on a number of rotations of the front propeller shaft 10, a steering angle sensor S7 for detecting a steering angle of a steering wheel (not shown), a yaw rate sensor S8 for detecting a yaw rate of a vehicle body, and a rear propeller shaft speed sensor S9 based on a number of rotations of the rear propeller shaft 12. Alternatively, or in addition to the yaw rate sensor S8, a lateral acceleration sensor S10 may be employed for detecting a lateral acceleration of a vehicle body (not shown).

The ECU 202 sends control output signals to a hydraulic actuator 204 adapted to supply pressurized hydraulic fluid to the conventional wheel brake assemblies (including an Antilock Braking System (ABS)) (not shown), the left and right hydraulic clutch assemblies 40L and 40R of the rear axle 20, and the left and right hydraulic clutch assemblies 240L and 240R of the front axle 206.

A first output signal 210 (E1) from the ECU 202 provides the hydraulic actuator 204 with instructions for controlling the operation of wheel brake assemblies of the vehicle braking system (including ABS) (not shown). A second output signal E2 from the ECU 202 provides the hydraulic actuator 204 with instructions for controlling the engaged states of the left and right hydraulic clutch assemblies 40L and 40R integrated into the wheel ends 38L and 38R of the rear axle 20 based on the signals from the sensors S1 to S10. A third output signal E3 from the ECU 202 provides the hydraulic actuator 204 with instructions for controlling the engaged states of the left and right hydraulic clutch assemblies 240L and 240R integrated into the wheel ends 238L and 238R of the front axle 206 based on the signals from the sensors S1 to S10.

The torque distribution between the left and right hydraulic clutch assemblies 40L, 40R and 240L, 240R and the front and rear axles 206 and 20 is attained through control of hydraulic pressure supplied to the clutch assemblies 40L, 40R, 240L and 40R by the hydraulic actuator 204.

The braking system employed in the vehicle 1 is of a well known form and does not require detailed description.

In operation, the ECU 202 variably controls the engine torque distribution between the wheel ends 238L and 238R of the front axle 206 and the wheel ends 38L and 38R of the rear axle 20, including the engine torque distribution between the diametrically opposed wheel ends, such as the wheel end 38L of the rear axle 20 and the wheel end 238R of the front axle 206, and/or the wheel end 38R of the rear axle 20 and the wheel end 238L of the front axle 206, that further enhances the dynamic vehicle control. Otherwise, the operation of the second exemplary embodiment of the present invention is substantially similar to the operation of the first embodiment.

Therefore, the vehicular axle assembly in accordance with the present invention represents a novel arrangement that improves torque distribution between left and right wheels of the motor vehicle, stability and drivability at cornering and on slippery road surfaces, and eliminates an axle differential gearing.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An axle assembly for selectively driving a pair of wheel ends in a motor vehicle, said assembly comprising:
   an input shaft;
   a drive gear assembly connecting said input shaft to a pair of output axle shafts;
   a pair of wheel end disconnect assemblies disposed between and selectively connecting each one of said pair of said output axle shafts to a corresponding one of said wheel ends;
   each of said wheel end disconnect assemblies having a hydraulically actuated friction clutch assembly integrated with said corresponding one of said wheel ends for facilitating both selective torque coupling and limited slip between either said wheel ends and said corresponding output axle shafts; and
   a control system controlling each of said friction clutch assemblies to selectively transfer torque from said input shaft to either said wheel ends.

2. The axle assembly as defined in claim 1, wherein said control system is used for controlling a braking system of said vehicle.

3. The axle assembly as defined in claim 1, wherein said control system includes an electronic control unit and a hydraulic actuator for supplying a pressurized hydraulic fluid independently to each of said hydraulically actuated friction clutch assemblies under pressure determined by said electronic control unit.

4. The axle assembly as defined in claim 3, wherein said control system includes a plurality of sensors for supplying electric signals representing operating parameters of said vehicle to said electronic control unit.

5. The axle assembly as defined in claim 4, wherein said plurality of sensors includes front and rear wheel speed sensors for detecting a speed of wheels of said vehicle, a first propeller shaft speed sensor for detecting a speed of said input shaft, a steering angle sensor for detecting a steering angle of a steering wheel of said vehicle, a yaw rate sensor for detecting a yaw rate of a body of said vehicle.

6. The axle assembly as defined in claim 5, wherein said plurality of sensors further includes a lateral acceleration sensor for detecting a lateral acceleration of said body of said vehicle.

7. A motor vehicle comprising:
a first axle assembly and a second axle assembly;
said first axle assembly including:
a first input shaft driven by a drive source;
a drive gear assembly connecting said first input shaft to a pair of output axle shafts;
a pair of wheel ends each coupled to one of said output axle shafts;
a pair of wheel end disconnect assemblies disposed between and selectively connecting each of said pair of output axle shafts to a corresponding one of said wheel ends; and
each of said wheel end disconnect assemblies having a hydraulically actuated friction clutch assembly integrated with said corresponding one of said wheel ends for facilitating both selective torque coupling and limited slip between either said wheel ends and said corresponding output axle shafts; and
a control system controlling each of said friction clutch assemblies to selectively transfer torque from said input shaft to either said wheel ends.

8. The motor vehicle as defined in claim 7, wherein said control system is also used for controlling a braking system of said vehicle.

9. The motor vehicle as defined in claim 7, wherein said control system includes an electronic control unit and a hydraulic actuator for supplying a pressurized hydraulic fluid independently to each of said hydraulically actuated friction clutch assemblies and to individual wheel brake assemblies under pressure determined by said electronic control unit.

10. The motor vehicle as defined in claim 9, wherein said control system includes a plurality of sensors for supplying electric signals representing operating parameters of said vehicle to said electronic control unit.

11. The motor vehicle as defined in claim 10, wherein said plurality of sensors includes front and rear wheel speed sensors for detecting a speed of wheels of said vehicle, a first propeller shaft speed sensor for detecting a speed of said first input shaft, a steering angle sensor for detecting a steering angle of a steering wheel of said vehicle, a yaw rate sensor for detecting a yaw rate of a body of said vehicle.

12. The motor vehicle as defined in claim 11, wherein said plurality of sensors further includes a lateral acceleration sensor for detecting a lateral acceleration of said body of said vehicle.

13. The motor vehicle as defined in claim 7, wherein said second axle assembly has a second input shaft driven by the same drive source.

14. The motor vehicle as defined in claim 13, wherein said second axle assembly is substantially similar to said first axle assembly and further includes:

a second drive gear assembly connecting said second input shaft to a pair of second output axle shafts;
a pair of second wheel ends, each coupled to one of said output axle shafts;
a pair of second wheel end disconnect assemblies disposed between and selectively connecting each of said pair of second output axle shafts to a corresponding one of said second wheel ends; and
each of said second wheel end disconnect assemblies having a second hydraulically actuated friction clutch assembly integrated with said corresponding one of said second wheel ends for facilitating both selective torque coupling and limited slip between either said second wheel ends and said corresponding second output axle shafts;
wherein each of said second friction clutch assemblies is controlled by said control system to selectively transfer torque from said second input shaft to either said second wheel ends.

15. The motor vehicle as defined in claim 14, wherein said control system is used for controlling a braking system of said vehicle.

16. The motor vehicle as defined in claim 14, wherein said control system includes an electronic control unit and a hydraulic actuator for supplying a pressurized hydraulic fluid to each of said hydraulically actuated friction clutch assemblies of both said first axle assembly and said second axle assembly under pressure determined by said electronic control unit.

17. The motor vehicle as defined in claim 16, wherein said control system includes a plurality of sensors for supplying electric signals representing operating parameters of said vehicle to said electronic control unit.

18. The motor vehicle as defined in claim 17, wherein said plurality of sensors includes front and rear wheel speed sensors for detecting a speed of wheels of said vehicle, a first propeller shaft speed sensor for detecting a speed of said first input shaft, a second propeller shaft speed sensor for detecting a speed of said second input shaft, a steering angle sensor for detecting a steering angle of a steering wheel of said vehicle, a yaw rate sensor for detecting a yaw rate of a body of said vehicle.

19. A motor vehicle comprising:
a first axle assembly including:
a first input shaft driven by a drive source;
a drive gear assembly connecting said input shaft to a pair of output axle shafts;
a pair of wheel ends each coupled to one of said output axle shafts;
a pair of wheel end disconnect assemblies disposed between and selectively connecting each of said pair of output axle shafts to a corresponding one of said wheel ends; and
each of said wheel end disconnect assemblies having a hydraulically actuated friction clutch assembly integrated with said corresponding one of said wheel ends for facilitating both selective torque coupling and limited slip between either said wheel ends and said corresponding output axle shafts;
a second axle assembly including:
a second input shaft driven by said drive source;
a pair of output axle shafts; and
a differential gearing assembly connecting said second input shaft to said output axle shafts for differential rotation therebetween; and
a control system controlling each of said friction clutch assemblies to selectively transfer torque from said first input shaft to either said wheel ends and for controlling a braking system of said vehicle, wherein said control system includes an electronic control unit and a hydraulic actuator for supplying a pressurized hydraulic fluid independently to each of said hydraulically actuated friction clutch assemblies and to individual wheel brake assemblies under pressure determined by said electronic control unit.

20. A motor vehicle comprising:

a first axle assembly and a second axle assembly, each of said first and second axle assemblies includes:
  an input shaft driven by a drive source,
  a drive gear assembly connecting said input shaft to a pair of output shafts,
  a pair of wheel ends each coupled to one of said output shafts,
  a pair of wheel end disconnect assemblies disposed between and selectively connecting each of said pair of output shafts to a corresponding one of said wheel ends,
  each of said wheel end disconnect assemblies having a hydraulically actuated friction clutch assembly integrated with said corresponding one of said wheel ends for facilitating both selective torque coupling and limited slip between either said wheel ends and said corresponding output shafts; and a control system controlling each of said friction clutch assemblies to selectively transfer torque from said input shaft of one of said first and second axle assemblies to either said wheel ends of corresponding one of said first and second axle assemblies and for controlling a braking system of said vehicle, wherein said control system includes an electronic control unit and a hydraulic actuator for supplying a pressurized hydraulic fluid independently to each of said hydraulically actuated friction clutch assemblies and to individual wheel brake assemblies under pressure determined by said electronic control unit.

* * * * *